United States Patent [19]

Yang

[11] Patent Number: 5,002,443

[45] Date of Patent: Mar. 26, 1991

[54] STRUCTURAL IMPROVEMENT FOR MAIN SHAFT OF RAM TYPE TOOLING MACHINE

[76] Inventor: Tai-Her Yang, 5-1 Taipin St., Si-Hu Town, Dzan-Hwa, Taiwan

[21] Appl. No.: 378,366

[22] Filed: Jul. 11, 1989

[51] Int. Cl.$^5$ .............................................. B23C 1/12
[52] U.S. Cl. .................................. 409/201; 409/216
[58] Field of Search ............... 409/204, 201, 211, 215, 409/216

[56] References Cited

U.S. PATENT DOCUMENTS

| 1,976,107 | 10/1934 | Archea | 409/216 X |
| 2,963,944 | 12/1960 | Straus | 409/216 X |
| 3,407,704 | 10/1968 | Reeber et al. | 409/211 |
| 4,478,540 | 10/1984 | Sachot | 429/211 |
| 4,610,584 | 9/1986 | Malzkorn et al. | 409/201 |
| 4,635,329 | 1/1987 | Holy et al. | 409/216 X |

FOREIGN PATENT DOCUMENTS

| 1304586 | 8/1962 | France | 409/211 |
| 16362 | of 1908 | United Kingdom | 409/211 |

Primary Examiner—William Briggs
Attorney, Agent, or Firm—Leonard Bloom

[57] ABSTRACT

An improvement in a ram type milling device having a swivel head structure. The ram is movable in opposite longitudinal directions. An auxiliary section is rotatably coupled to the ram for 0-360 degrees rotation relative thereto. An output head section that carries the output shaft, is rotatably coupled to the auxiliary section for 0-360 degrees rotation relative to the auxiliary section and/or the ram. The machine body of the device has a shaft hole formed therein for receiving one of the ends of a milling tool carried by the output shaft. Guide rail and guide feet are also provided for supporting and guiding the milling tool when desired. A milling tool carried therein by this device may be selectively moved in any of six directions or planes, as desired or needed for working on a workpiece.

3 Claims, 4 Drawing Sheets

STRUCTURAL IMPROVEMENT FOR MAIN SHAFT OF RAM TYPE TOOLING MACHINE

BACKGROUND OF THE INVENTION

The present invention relates to structural improvements to ram type milling devices (machines) and, in particular, to elements that may be associated with the ram and which may rotate up to 360 degrees relative to the ram, so that a milling tool carried thereby may be moved and adjusted in at least six different directions, and to elements for placing and securing a horizontal cutter bar, so as to permit vertical and horizontal operations.

SUMMARY OF THE INVENTION

The present invention relates to a structural improvement for a ram type milling device of the type that includes the coupling plane of a longitudinally-adjustable ram terminates in an oblique plane that is positioned at a 45 degree angle relative to the remainder of the arm; an auxiliary section that includes a rearward coupling plane that is coupled to the oblique coupling plane of the ram and an opposite inter-output plane. The auxiliary section further has a substantially 45 degree bend formed therein between the two planes thereof; an output head section is coupled with the inter-output plane of the auxiliary section. This output head carries the output shaft therein; the auxiliary section and the output section are independently rotatable up to 360 degrees relative to the ram. In this manner, along with the longitudinal movement of the ram provided by appropriate means, the output shaft may be moved in either first or second longitudinal directions, as well as in respective third, fourth, fifth and sixth clockwise and counter-clockwise rotational directions.

Further, the ram type milling device of the present invention is equipped with a shaft hole formed therein below the ram. The shaft hole is provided, so that when the tool is a horizontal cutter bar, one of the ends of the bar (the forward end) is received and supported therein.

The bent, oblique or curved rams, auxiliary sections and/or output head sections described herein may be substituted by such conventional components as desired or needed, so that an overall 90 degree differential angle is provided therein.

DETAILED DESCRIPTION OF THE DRAWINGS

Figure 1:
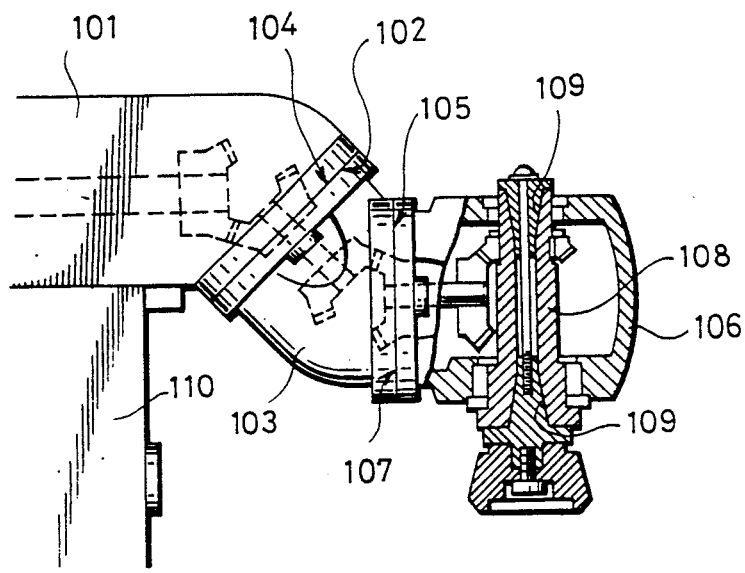
FIG. 1 is a side view of the present invention, with portions thereof broken away for the sake of clarity.

Conventional ram-type milling (tooling) machines have a ram that is able to longitudinally move forwardly and rearwardly. They also include a universal main shaft head that is capable of selective 0-360 degree rotation and positioning. Another auxiliary section is provided with one of its ends coupled to the base. This auxiliary section has a 45 degree bend formed therein, terminating in a forward output (inter-output) oblique plane. An output head section has a rearward coupling plane for coupling with the output oblique plane of the auxiliary section for selective 0-360 degree rotation and positioning by either mechanical or manual means. This output head section carries an output shaft forwardly of the rearward coupling plane, so as to permit the shaft to be moved upward/downward, forward, leftward/rightward in five directions (planes) and block-free position adjustment for cutting workpieces. Also, this arrangement is useful as a common-type for driving the horizontal cutter-shaft from the internal side by means of a vertical main shaft that has horizontal milling frame accessories affixed thereto. Unfortunately, the use and affixation of such accessories reduces the strength thereof and is not convenient. This arrangement can also be useful for common types to drive, from the internal side by the vertical shaft, by means located on top of the vertical cutter head structure that is affixed to an auxiliary support arm. Unfortunately, the addition of such an auxiliary support arm increases the cost and weight of the device.

Also, for practical reasons, the output shaft often needs to be moved in a sixth direction (plane) to perform inward milling, such as on a universal milling machine.

The device of the present invention is applicable for and permits such inward movement of the output shaft in the sixth direction (plane) to perform inward milling. This is achieved by providing a shaft hole (which may either be a through hole or a blind-ended bore) which receives therein an end of the horizontal cutter shaft. The output shaft of such a device is thus able to be moved in, and to do processing in, six directions (planes), as is shown in FIGS. 1A-1F.

With particular reference now to the figures, the various embodiments of the device of the present invention is illustrated. As can be seen, the device is an improvement in a ram-type milling device (machine) of the type that has a machine body, a ram that is carried by the machine body for sliding longitudinal movement of the ram in a first forward direction and in a second rearward direction. Conventional drive mechanisms or means are provided for longitudinally moving and selectively adjusting the longitudinal position of the ram. A conventional locking mechanism (means) is provided for locking the ram in the selected longitudinal position. A milling tool is operatively associated with the ram for concomitant longitudinal movement therewith in the first and second directions (planes). Finally, appropriate mechanisms (means) are provided for driving the milling tool.

Figure 2:
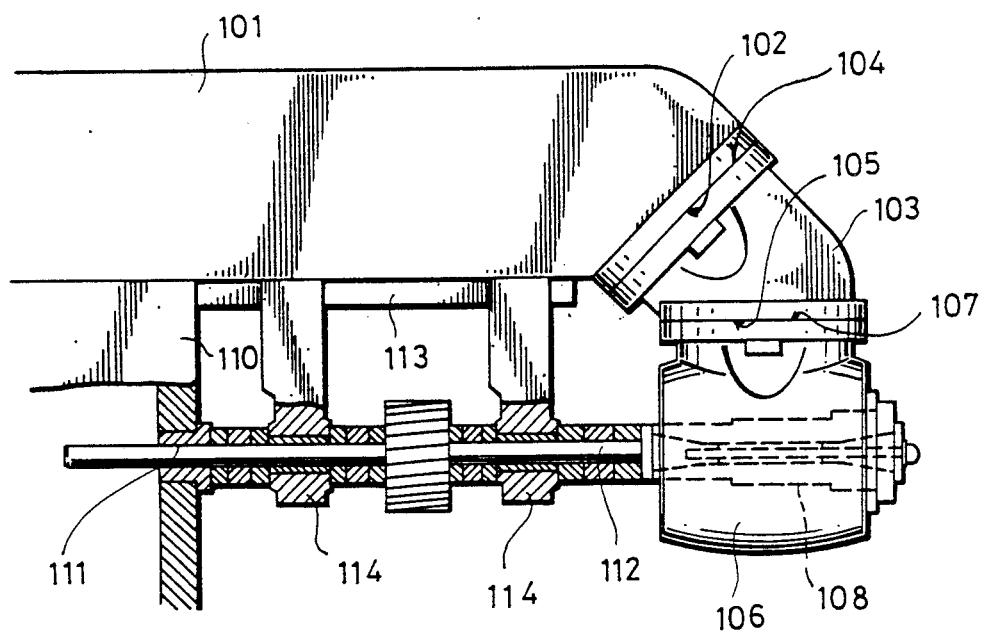
FIG. 2 is another side view of the device of the present invention with portions thereof broken away for the sake of clarity.
Figure 1A:
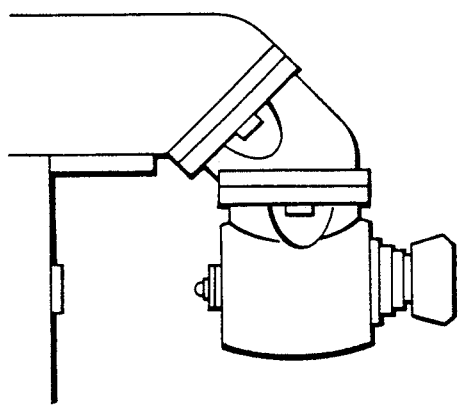
FIGS. 1A-1F illustrate the various six positions (planes) in which a tool carried by the device of the present invention may be selectively adjusted.
Figure 1B:
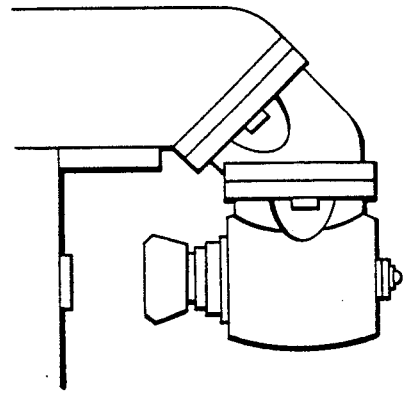
Figure 1C:
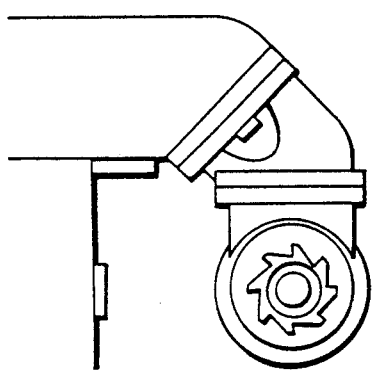
Figure 1D:
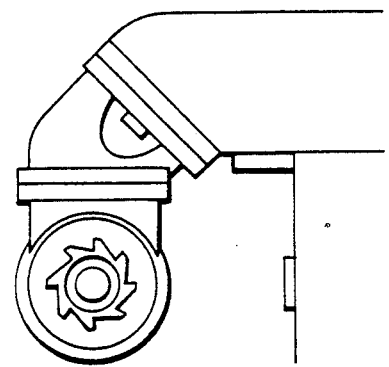
Figure 1E:
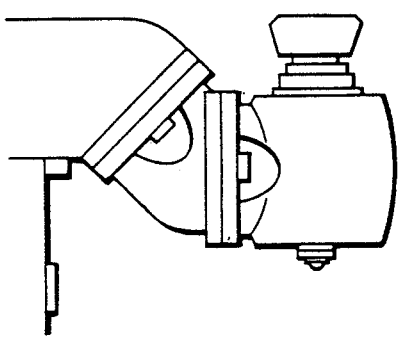
Figure 1F:
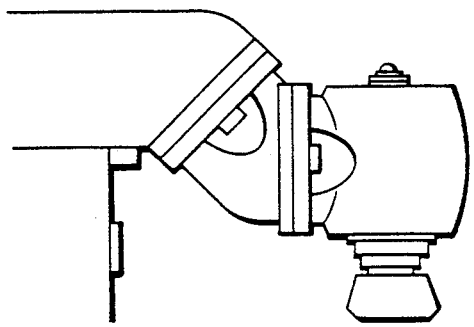
Figure 3:
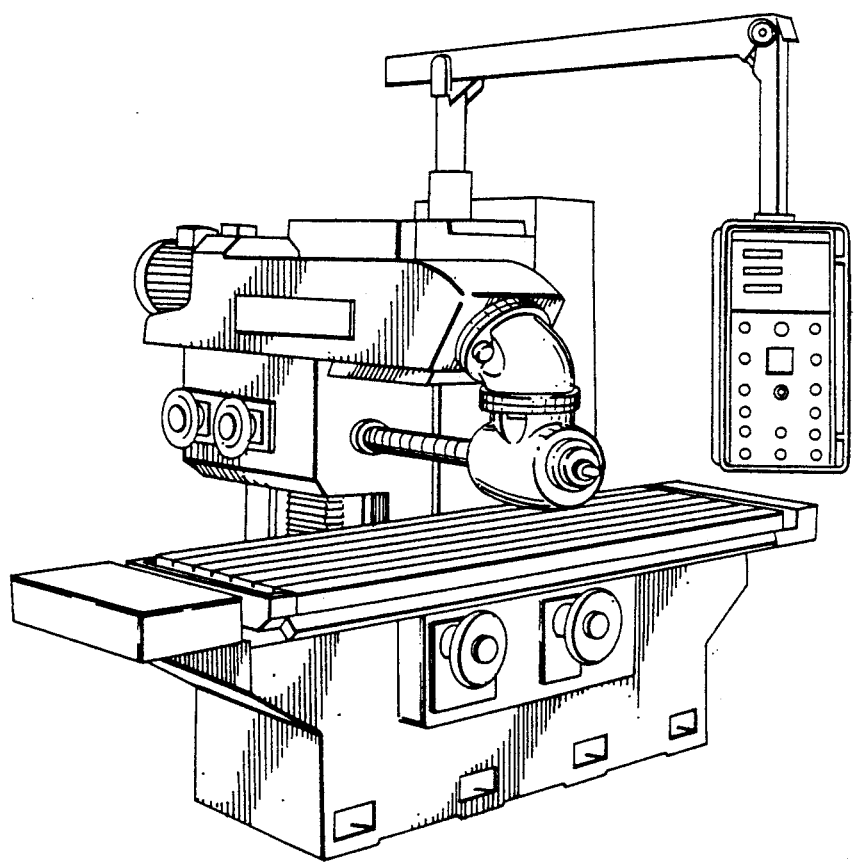
FIG. 3 is a perspective view of the ram type milling device of the present invention.

Referring in particular now to FIGS. 1 and 2, in addition to the conventional structures noted above, in a first embodiment, the device of the present invention includes the following features.

The ram 101 which is able to shift (longitudinally move or slide) forward (in a first forward direction) and backward (in a second rearward direction) for adjustment and driving (i.e., during milling) has a forward end that extends from the machine body 110 and a second end that is operatively slidably connected thereto. The forward end of the ram 101 terminates in a 45 degree oblique plane 102 that is positioned at a 45 degree angle relative to the remainder of the ram 101.

An auxiliary section 103 having a forward output (inter-output) plane 105 and a rearward coupling plane 104 is provided. The rearward coupling plane 104 is parallel with and rotatably coupled to the forward end 102 of the ram 101. In this fashion, the auxiliary section 103 may be selectively rotated from between 0-360 degrees relative to the ram 101 (co-axial rotary adjustment). The auxiliary section 103 also has a substantially 45 degree bend formed therein for allowing the output plane 105 to be adjusted and locked relative to the ram 101 in any of various angles or on any of various planes.

An output head section 106 is provided having a rearward coupling plane 107 that is parallel with and rotatably coupled to the forward output plane 105. In this fashion, the output head section 106 may be selectively rotated and positioned from between 0-360 degrees relative to the ram 101 and the auxiliary section 103.

An output shaft 108 is carried by the head section 106 forwardly of the rearward coupling plane 107. The output shaft 108 has a longitudinal axis that is positioned, so as to be substantially parallel to the rearward coupling plane 107 of the head section 106. The output shaft 108 further has a longitudinal bore (shaft hole) 109 formed therein for receiving and securing the milling tool therein.

In the above manner, the milling tool may be moved in the first forward and second rearward longitudinal directions by longitudinal movement of the ram 101. Further, the tool may also be moved in a third clockwise and a fourth anticlockwise directions by rotational movement of the auxiliary section 103 and the head section 106 relative to the ram 101. Finally, the tool may also be moved in a fifth clockwise and a sixth anti-clockwise directions by rotational movement of the head section 106 relative to the auxiliary section 103 and the ram 101.

The machine body 110 of the device (including those devices having a vertical column-type machine body or an elevated-type machine body) has a shaft hole (or a blind-ended bore) 111 formed therein located below the ram 101. In this fashion, when the tool is a horizontal cutter bar 112 having a first end received and secured in the longitudinal bore 109 of the output shaft 108 and driven thereby, the second opposite end of the cutter bar is received in the shaft hole 111.

Further, the ram 101 has at least one lower guide rail 113 formed thereon. Guide feet 114 are disposed on the guide rail(s) 13, so that the horizontal cutter bar 112 is supported by the feet 114. The guide feet 114 furthermore are adjustable along the length of the guide rail 113.

Figure 4:
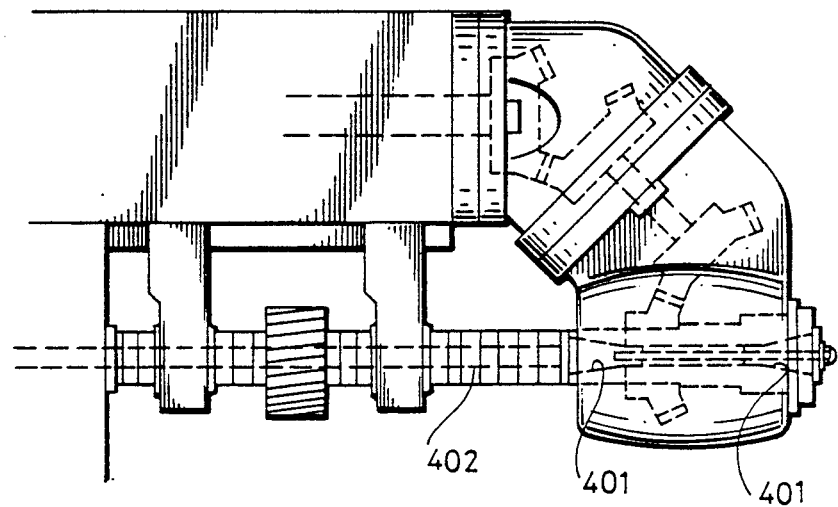
FIG. 4 is a side view of another embodiment of the device of the present invention.
Figure 5:
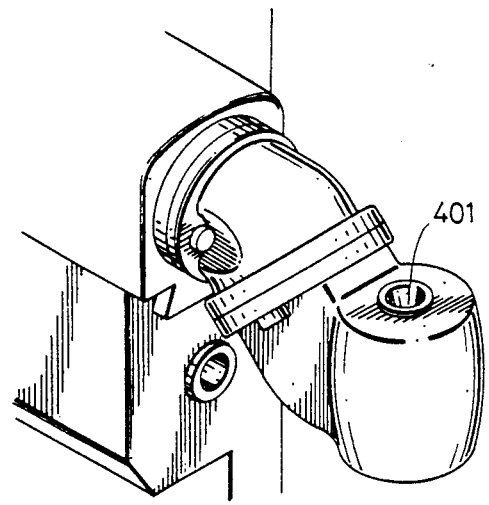
FIG. 5 is a perspective view, substantially corresponding to the embodiment of FIG. 4.

With reference now to FIGS. 4 and 5, a second embodiment of the device is illustrated. With the exception of those features to hereinafter be noted, the elements of this embodiment are the same as those of the embodiment seen in FIGS. 1 and 2.

In the embodiment of FIGS. 4 and 5, the forward end of the ram terminates in a substantially vertical plane that is located at a right (90 degree) angle relative to the longitudinal axis of the ram. The output head section has a substantially 45 degree bend formed therein between the rearward coupling end thereof and the output shaft 401 carried thereby. In this fashion, the output shaft 401 (and the milling tool 402 carried therein) is located, so that the longitudinal axis thereof is located on a substantially 45 degree angle relative to the rearward coupling plane of the head section.

Formed as described above, the second embodiment seen in FIGS. 4 and 5 is capable of selective adjustment and positioning in any of the six different directions (planes) mentioned above.

Figure 6:
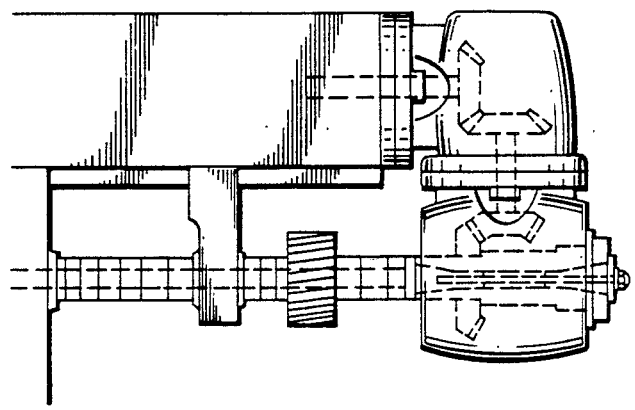
FIG. 6 is a side view of still another embodiment of the device of the present invention.
Figure 7:
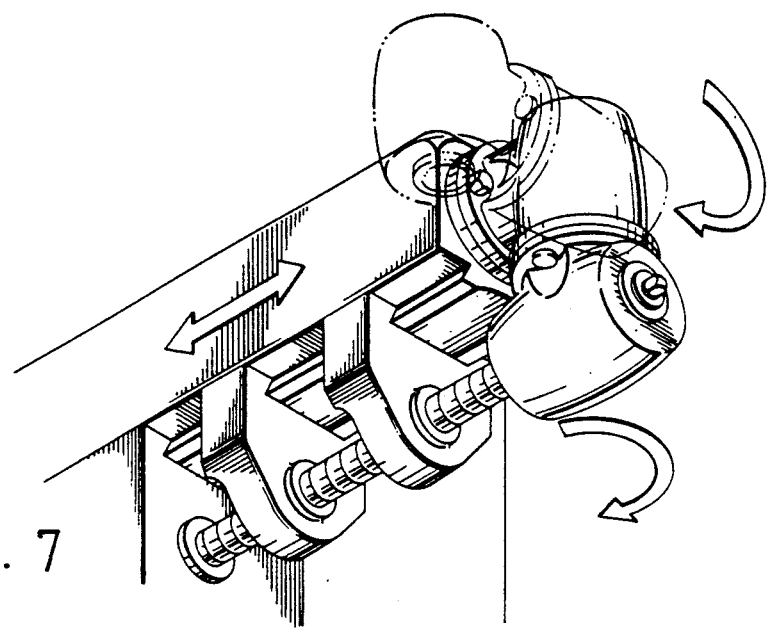
FIG. 7 is a perspective view substantially corresponding to the embodiment of FIG. 6 and further showing, by arrows and in phantom lines, the movement of the output shaft in the six different directions (planes).

With reference now to FIGS. 6 and 7, a third embodiment of the device is illustrated. Again, with the exception of those features to hereinafter be noted, the elements of this embodiment are the same as those of the embodiment seen in FIGS. 1 and 2.

In the embodiment of FIGS. 6 and 7, the forward end of the ram terminates in a substantially vertical plane that is located at a right (90 degree) angle relative to the longitudinal axis of the ram. The auxiliary section has a substantially ninety degree (90 degree) bend formed therein between the rearward coupling end thereof and output plane thereof. The head section is coupled by the rearward coupling end thereof to the output plane of the auxiliary section. The output shaft is carried by the head section along a longitudinal axis that is substantially parallel to the rearward coupling plane of the head section.

I claim:

1. In a ram type milling device of the type having a machine body, a ram carried by the machine body for sliding longitudinal movement of the ram in a first forward and in a second rearward direction, means for longitudinally moving and selectively adjusting the longitudinal position of the ram, means for locking the ram in the selected longitudinal position, a milling tool operatively associated with the ram for concomitant longitudinal movement therewith in the first and second directions and means for driving the milling tool, the improvement thereupon comprised of:

the ram having a forward end that extends from the machine body and a second end that is operatively slidably connected to the machine body, the forward end of the ram terminating in an oblique plane being positioned at a 45 degree angle relative to the remainder of the ram;

an auxiliary section having a forward output plane and a rearward coupling plane, the rearward coupling plane being parallel with and rotatably coupled to the forward end of the ram, so that the auxiliary section may be selectively rotated from between 0-360 degrees relative to the ram, and the auxiliary section having a substantially 45 degree bend formed therein;

an output head section having a rearward coupling plane being parallel with the forward output plane and rotatably coupled thereto, so that the output head section may be selectively rotated from between 0-360 degree relative to the ram and the auxiliary section;

an output shaft carried by the head section forwardly of the rearward coupling plane, the output shaft having a longitudinal axis positioned, so as to be substantially parallel to the rearward coupling plane of the head section, the output shaft further having a longitudinal bore formed therein for receiving and securing the milling tool therein;

such that the milling tool may be moved in first forward and second rearward longitudinal directions by longitudinal movement of the ram, the tool may further be moved in a third clockwise and a fourth anticlockwise directions by rotational movement of the auxiliary section and the head section relative to the ram, and the tool may still further be moved in a fifth clockwise and a sixth anticlockwise directions by rotational movement of the head section relative to the auxiliary section and the ram; and the machine body having a shaft hole formed therein located below the ram, the ram having a lower guide rail formed thereon and guide feet that are disposed on the guide rails, so that when the tool is a horizontal bar having a first end received and secured in the longitudinal bore of the output shaft and driven thereby and a second opposite end, the second opposite end may be received in the shaft hole and supported by the feet.

2. In a ram type milling device of the type having a machine body, a ram carried by the machine body for sliding longitudinal movement of the ram in a first forward and in a second rearward direction, means for longitudinally moving and selectively adjusting the longitudinal position of the ram, means for locking the ram in the selected longitudinal position, a milling tool operatively associated with the ram for concomitant longitudinal movement therewith in the first and second directions and means for driving the milling tool, the improvements thereupon comprised of:

the ram having a forward end that extends from the machine body and a second end that is operatively connected to the machine body, the forward end of the ram terminating in a substantially vertical plane;

an auxiliary section having a forward output plane and a rearward coupling plane, the rearward coupling plane being parallel with and rotatably coupled to the forward end of the ram, so that the auxiliary section may be selectively rotated from between 0–360 degrees relative to the ram and the auxiliary section having a substantially 45 degree bend formed therein;

an output head section having a rearward coupling plane being parallel with the forward output plane and rotatably coupled thereto, so that the output head section may be selectively rotatable from between 0–360 degrees relative to the ram and the auxiliary section;

an output shaft carried by the head section forwardly of the rearward coupling plane, the output shaft having a longitudinal axis positioned, so as to be located on a substantially 45 degree angle relative to the rearward coupling plane of the head section, the output shaft further having a longitudinal bore formed therein for receiving and securing the milling tool therein;

such that the milling tool may be moved in first forward and second rearward longitudinal directions by longitudinal movement of the ram, the tool may further be moved in a third clockwise and a fourth anticlockwise directions by rotational movement of the auxiliary section and the head section relative to the ram, and the tool may still further be moved in a fifth clockwise and a sixth anticlockwise directions by rotational movement of the head section relative to the auxiliary section and the ram; and the machine body having a shaft hole formed therein located below the ram, the ram having a lower guide rail formed thereon and guide feet that are disposed on the guide rail, so that when the tool is a horizontal cutter bar having a first end received and secured in the longitudinal bore of the output shaft and driven thereby and a second opposite end, the second opposite end may be received in the shaft hole and supported by the feet.

3. In a ram type milling device of the type having a machine body, a ram carried by the machine body for sliding longitudinal movement of the ram in a first forward and in a second rearward direction, means for longitudinally moving and selectively adjusting the longitudinal position of the ram, means for locking the ram in the selected longitudinal position, a milling tool operatively associated with the ram for concomitant longitudinal movement therewith in the first and second directions and means for driving the milling tool, the improvement thereupon comprised of;

the ram having a forward end that extends from the machine body and a second end that is operatively connected to the machine body, the forward end of the ram terminating in a substantially vertical plane;

an auxiliary section having a forward output plane and a rearward coupling plane, the rearward coupling plane being parallel with and rotatably coupled to the forward end of the ram, so that the auxiliary section may be selectively rotated from between 0–360 degrees relative to the ram and the auxiliary section having a substantially 90 degree bend formed therein;

an output head section having a rearward coupling plane being parallel with the forward output plane and rotatably coupled thereto, so that the output head section may be selectively rotated from between 0–360 degrees relative to the ram and the auxiliary section;

an output shaft carried by the head section forwardly of the rearward coupling plane, the output shaft having a longitudinal axis positioned so as to be located substantially parallel to the rearward coupling plane of the head section, the output shaft further having a longitudinal bore formed therein for receiving an securing the milling tool therein;

such that the milling tool may be moved in first forward and second rearward longitudinal directions by longitudinal movement of the ram, the tool may further be moved in a third clockwise and a fourth anticlockwise directions by rotational movement of the auxiliary section and the head section relative to the ram, and the tool may still further be moved in a fifth clockwise and a sixth anticlockwise directions by rotational movement of the head section relative to the auxiliary section and the ram; and the machine body having a shaft hole formed therein located below the ram, the ram having a lower guide rail formed thereon and guide feet that are disposed on the guide rail, so that when the tool is a horizontal cutter bar having a first end received and secured in the longitudinal bore of the output shaft and driven thereby and a second opposite end, the second opposite end may be received in the shaft hole and supported by the feet.

* * * * *